3,152,920
ANTISTATIC, SOIL-RESISTANT COATINGS

John R. Caldwell and Russell Gilkey, Kingsport, Tenn., assignors to Eastman Kodak Company, Rochester, N.Y., a corporation of New Jersey
No Drawing. Filed Sept. 20, 1962, Ser. No. 225,084
6 Claims. (Cl. 117—138.8)

This invention relates to antistatic, soil-resistant coatings for textile fibers and other shaped objects, and the process of preparing such coatings.

Shaped articles composed of hydrophobic materials such as synthetic resins tend to accumulate static charges. The formation of these charges is especially noticeable in fibers and textile articles made therefrom. Such materials are completely unsatisfactory for certain purposes and somewhat unsatisfactory in various applications due to the accumulation of static charges. Therefore, it is desirable to provide coatings for shaped articles composed of hydrophobic materials which dissipate static charges but do no impair critical properties of the composition such as tensile strength, flexibility, elongation and resistance to chemicals, bacteria and fungi. In addition, especially in the case of textiles, it is advantageous to supply a hydrophilic surface over the hydrophobic composition where the absorption of water is an asset, for example, in undergarments. Further, it would be desirable if the antistatic coatings provided resistance to pickup of oily dirt during laundering. Such properties would be particularly advantageous when imparted to fibers and textiles composed of polyester-type materials.

One object of our invention is to provide antistatic coatings for shaped articles composed of hydrophobic compositions. Another object of our invention is to provide coatings for shaped articles composed of hydrophobic compositions, which coatings are resistant to soiling. A further object of our invention is to provide fibers and textile articles prepared therefrom with coatings which are resistant to the accumulation of static charges and soiling. Other objects of our invention will appear herein.

These and other objects of our invention are accomplished by antistatic, soil-resistant coatings comprising a polymer having a molecular weight of 500–750,000 and containing an acidic group selected from the class consisting of carboxyl, sulfonic and phosphoric, at least 10 percent of the acidic groups being carboxyl and having a ratio of carbon atoms to acidic groups in the repeating unit of the polymer in the range of 2:1 to 20:1 (such polymers are referred to herein as polymeric polybasic acids) which polymer is crosslinked with 10–400 percent, based on the weight of the polymeric polybasic acid, of the reaction product of organic polyisocyanate and polyol (referred to as a polyol-polyisocyanate reaction product).

We have found that shaped articles having a coating thereon in accordance with our invention have excellent antistatic properties and are resistant to soiling.

The method of treating shaped articles in accordance with our invention to provide such articles with antistatic and soil-resistant properties will be described more fully hereinafter.

Examples A–G will illustrate the preparation of various reaction products of organic polyisocyanates with polyols.

EXAMPLE A

The reaction product of toluene-2,4-diisocyanate and tetraethylene glycol was prepared from a 2.7:1 molar ratio of the two reactants. A mixture of 10.95 g. (0.056 mole) of tetraethylene glycol and 150 ml. benzene was placed in a flask and 50 ml. benzene was distilled therefrom to azeotrope off any water which might be present. This solution was transferred to a dropping funnel protected from moisture by a calcium sulfate drying tube. The contents of the dropping funnel were added slowly at room temperature to a solution of 26.1 g. (0.15 mole) of toluene-2,4-diisocyanate in 100 ml. benzene contained in a 500 ml. flask fitted with reflex condenser and also protected by a drying tube. The solution was refluxed on a steam bath for one hour. A clear solution containing 0.185 g./ml. of isocyanate-terminated reaction product was obtained.

EXAMPLE B

The reaction product of toluene-2,4-diisocyanate and polyethylene glycol having a molecular weight of 400 (obtained as Carbowax 400 from Union Carbide and Chemical Company) was prepared from a 2:1 molar ratio of the reactants in the manner described in Example A.

EXAMPLE C

A low molecular weight hydroxy-terminated polyester, prepared from a 3:2 molar ratio of 1,4-cyclohexane dimethanol to sebacic acid, was reacted with toluene-2,4-diisocyanate in molar excess in accordance with the method described in Example A. A hazy solution containing 0.275 gram/ml. of isocyanate-terminated reaction product was obtained.

EXAMPLES D–G

Several isocyanate-terminated reaction products were prepared by the procedure described in Example A. In each instance, the organic polyisocyanate was reacted in a 2:1 molar excess with the dihydric alcohol. The following reaction products were obtained:

D. Hexamethylene diisocyanate+polyoxypropylene glycol, molecular weight 500.
E. 4,4' - methylenebis(phenylisocyanate)+polyoxybutylene glycol, molecular weight 1,000.
F. 4,4',4'' - methylenetris(phenylisocyanate)+polyoxytetramethylene glycol, molecular weight 1,500.
G. 4,4' - methylenebis(phenylisocyanate)+decanediol polyformal, molecular weight 1,200.

The following examples will illustrate the antistatic, soil-resistant coatings of our invention and the method of preparing such coatings.

EXAMPLE 1

An aqueous solution was prepared containing 0.25% of polyacrylic acid having a Brookfield LVF viscosity of 15,000 cps. at 12 r.p.m., No. 2 spindle, 78° F., at a concentration of 15% solids. A swatch of Kodel (trademark of Eastman Kodak Company for poly-1,4-cyclohexanedimethylene terephthalate) fabric 2 inches x 4 inches was immersed in the aqueous polyacrylic acid solution and passed through rollers to give a wet pickup of 100%. The fabric was dried in an oven at 100° C. The coated fabric was then immersed in a benzene solution containing 1% of the reaction product from Example C and 0.5% Igepal CO–630 (a nonionic synthetic detergent having the general formula of alkylphenoxy polyoxyethylene glycol). The fabric was pressed until an amount of solution equal to its own weight remained. The benzene was then evaporated and the fabric was heated at 110° C. for 30 minutes. Unreacted material was scoured off by heating the fabric for 30 minutes at 71° C. with stirring in a scouring bath consisting of 0.5% sodium stearate and 0.2% sodium carbonate. The sodium salt of the polyacrylic acid reaction product was formed in the scouring operation.

The effectiveness of the hydrophilic coating was determined by placing a small strip, ½ x 2 inches, of the dry treated fabric in vertical contact with a water solution of a direct cotton dye so that the bottom of the strip barely touched the surface of the solution. The rate at which the colored solution advanced up the strip of treated fabric was compared with an untreated fabric to obtain an indication of its hydrophilic character and wetability with water. The fabric treated in accordance with Example 1 was tested in accordance with this procedure, and the dye solution wicked to the top of the strip in less than a minute. Several hours elapsed before the solution eventually wicked up the untreated Kodel. After five scourings with an aqueous solution containing 0.5% sodium stearate and 0.2% sodium carbonate, the fabric which had been treated in accordance with Example 1 still wet readily. The rate of wetting was only slightly reduced after 10 scourings.

A more exact determination of the antistatic properties of the treated fabric was carried out by measuring its electrical resistivity. This was accomplished by measuring the resistance of one square inch of fabric with a Keithly Model 510 megohmmeter in a chamber controlled to 50% relative humidity. Untreated Kodel fabric was found to have a resistance of $2 \times 10^{13}$ ohms and mercerized cotton has a resistance of $9 \times 10^{10}$ ohms. After four scourings, the treated fabric had a resistance of $9 \times 10^9$ ohms. After thirteen scourings, the resistance was $1 \times 10^{11}$ ohms. This test shows that fabric treated in accordance with our invention has antistatic properties substantially as good as cotton, which is known to be free from objectionable electrification.

EXAMPLES 2–7

The procedure of Example 1 was followed except that the polyol-polyisocyanate reaction products obtained in Examples A, B, D, E, F and G were used instead of the polyol-polyisocyanate obtained in accordance with Example C. Excellent antistatic coatings found to be durable to washing and dry cleaning were obtained.

EXAMPLE 8

An aqueous emulsion was made containing 0.25% polyacrylic acid (as described in Example 1), 50% neutralized with sodium hydroxide, 10% sodium bisulfite, 1% of the reaction product obtained in Example D, and 0.5% Igepal CO–630 by homogenizing in a Waring Blendor. Kodel fabric was immersed in the emulsion and squeezed to obtain a wet pickup of 100%. The fabric was then dried at 110° C. and cured at that temperature for 30 minutes. The resistance of the fabric after 12 scourings was $3 \times 10^{10}$ ohms.

EXAMPLES 9–16

Various fabrics were coated with several combinations of polymeric polybasic acids and crosslinked with polyol-polyisocyanate reaction products obtained in accordance with Examples A–G. The procedure of Example 1 was followed except that where the polymeric polybasic acid was not soluble in water, dioxane or dioxane-water mixtures were employed. The electrical resistance of the treated and untreated material was tested in the manner described in Example 1. The results are shown in Table 1.

*Table 1*

| Polymeric Polybasic Acid | | Isocyanate Reaction Product | | Fabric | Resistance (ohms) | |
|---|---|---|---|---|---|---|
| Composition | Add on, Percent | Composition of— | Add on, Percent | | Untreated Fabric | Treated Fabric |
| Polymethacrylic acid | 0.4 | Example A | 0.2 | Dacron [2] | $1 \times 10^{13}$ | $8 \times 10^9$ |
| Styrene maleic anhydride copolymer | 1.0 | Example B | 0.5 | Orlon [3] | $2 \times 10^{13}$ | $2 \times 10^{10}$ |
| 80% Acrylic acid—20% ethyl acrylate copolymer | 0.5 | Example E | 0.5 | Cellulose acetate | $2 \times 10^{13}$ | $3 \times 10^{10}$ |
| Sulfonated styrenemaleic anhydride copolymer [1] | 0.3 | Example F | 0.5 | Nylon | $2 \times 10^{12}$ | $2 \times 10^9$ |
| Poly(vinyl benzenesulfonate) | 0.25 | Example G | 1.0 | Verel [4] | $2 \times 10^{13}$ | $4 \times 10^9$ |
| Phosphoric acid ester of 54% glycidyl allyl ether—46% sodium acrylate copolymer | 1.0 | Example B | 0.5 | Kodel [5] | $2 \times 10^{13}$ | $4 \times 10^{10}$ |
| 99% Acrylic acid—10% allylsulfoacetate copolymer | 0.3 | Example F | 0.5 | Polypropylene | $2 \times 10^{13}$ | $7 \times 10^9$ |
| 85% Acrylic acid—15% lithium salt of N(p-sulfophenyl) maleamic acid | 0.25 | Example B | 1.0 | Kodel [5] | $2 \times 10^{13}$ | $6 \times 10^9$ |

[1] Averaging 1 sulfonic acid group per benzene.
[2] Trademark of E. I. du Pont for polyethylene terephthalate fiber.
[3] Trademark of E. I. du Pont for poly(acrylonitrile) fiber.
[4] Trademark of E. K. Co. for modacrylic fiber.
[5] Trademark of E. K. Co. for poly-1,4-cyclohexanedimethylene terephthalate fiber.

The results set out on the foregoing table show that the coatings of our invention may be advantageously applied to a variety of substrates to provide a surface finish having a low resistance to electrical conduction.

EXAMPLE 17

The anti-soiling properties of the Kodel fabric treated in accordance with Example 1 was determined by washing a piece of the fabric with a piece of cotton fabric which had been soiled by applying carbon black dispersed in a mixture of mineral oil, stearic acid, lanolin and lard. Untreated Kodel fabric was also incorporated in the wash. The untreated fabric picked up dirt from the wash and its original appearance of white had been discolored to grey. However, the same Kodel fabric, when treated in accordance with Example 1, did not pick up any color and remained white even after three separate washings with fresh pieces of the soiled cotton fabric being added to each wash.

The acid groups contained in the polymeric polybasic acids of our invention may be carboxyl, sulfonic, and/or phosphoric. At least 10% of the acid groups should be carboxyl. These acidic groups may be attached to a carbon chain backbone derived from a polymerizable aliphatic mono- or polycarboxylic acid, e.g., acrylic acid, fumaric acid, maleic acid, itaconic acid, methacrylic acid, α-chloroacrylic acid, etc. Interpolymers of monocarboxylic acids with polymerizable vinyl or vinylidene monomers, e.g., interpolymers of acrylic acid with methylacrylate, vinyl acetate, vinylidene chloride, styrene, or the like, may also be used. The hydrolyzed, alcoholyzed, or aminolyzed interpolymers of α,β-ethylenically unsaturated dicarboxylic acid anhydrides, such as maleic anhydride, with polymerizable vinyl or vinylidene monomers are also suitable. Similar polymeric compounds containing acidic groups may be obtained from a derivative of the polymer, such as the esters, amides, nitriles, etc., by hydrolysis or other reaction which generates the acidic group.

Another method of forming polymeric polybasic acids is to react a polymeric material containing reactive functional groups with a compound which retains at least one acidic group after the reaction. The esterification of polyvinyl alcohol with a polycarboxylic acid is illustrative of this method. Polymers or copolymers derived from the addition or condensation of monomers need contain only acidic functional groups. However, other groups may be present and in certain applications, it may be desirable to include other hydrophilic groups such as hydroxy, amide, ether, etc. It may also be desirable in certain applications to include nonpolar linkages to improve the flexibility of the coating.

In our preferred embodiment, the ratio of carbon atoms to acidic groups in the repeat unit of the polymeric polybasic acid should be from 2:1 to 10:1 and may be from 2:1 to 20:1. Atoms other than carbon may also be present in the backbone or on the side groups of the polymeric chain. These polymeric materials should have a molecular weight of 500–750,000 and preferably 200,000–750,000. The higher molecular weight products in general give coatings which are more flexible and adherent.

The polyol-polyisocyanate reaction products which are employed in accordance with our invention may be obtained by reacting any organic polyisocyanate with a di- or poly-functional hydroxy-terminated material to obtain a polymeric product terminated in isocyanate groups. Suitable polyisocyanates include hexamethylene diisocyanate, toluene-2,4-diisocyanate, 4,4'-methylene bis(phenylisocyanate), m-phenylenediisocyanate, cyclohexylenediisocyanate, toluene-2,4,6-triisocyanate and the like.

A large number of polyols may be reacted with an organic polyisocyanate to produce useful crosslinking agents in accordance with our invention. Glycols suitable for use in the practice of our invention include straight- and branched-chain aliphatic glycols, alicyclic glycols, cycloaliphatic glycols, and arylenealiphatic glycols containing 2–36 carbon atoms. Typical examples of these glycols are ethylene glycol, 1,6-hexanediol, 2,2-dimethyl-1,3-propanediol, 1,4-cyclohexanediol, 1,3- or 1,4-cyclohexanedimethanol, 2,2,4,4 - tetramethyl - 1,3 - cyclobutanediol, and p-xylylene glycol. Polyols containing three or more hydroxyl groups are also useful, such as glycerine trimethylolpropane, pentaerythritol, dipentaerythritol, sorbitol and the like. Glycols and polyols containing ether linkages are especially valuable due to their hydrophilic nature. Included in this class are poly(oxyalkylene glycols) such as poly(ethylene glycol), poly(propylene glycol), poly(tetramethylene glycol), copoly(ethylenepropylene glycol), glycerine poly(ethylene glycol), and the like. The polyether polyols may have a molecular weight of 106–4,000. Other useful polyols include hydroxy-terminated polyesters in which a di- or poly(carboxylic acid) containing 4–36 carbon atoms is reacted with an excess of polyol to give a polymer having an acid number less than 10, and preferably less than 5. Small amounts of carboxyl end groups may be present since these groups also react with the isocyanate. The molecular weight of the hydroxy-terminated polyester should be in the range of 200–10,000 and preferably is 400–4,000.

The antistatic, soil-resistant coatings of our invention may be applied to substrates by any of the accepted procedures used in coating films, fibers, fabrics, or other shaped articles. This includes padding, dipping, brushing, spraying, roll transfer, spreading and the like. The polymeric polybasic acid may be applied separately or simultaneously with the polyol-polyisocyanate reaction product. Simultaneous application requires the use of a capped or inhibited polyol-polyisocyanate reaction product; that is, one which is comparatively unreactive under the conditions of application but which will break down to the reactive isocyanate upon heating. Typical compounds which react with isocyanate groups to give heat-reversible intermediates are phenol, dimethylmalonate, ethyl acetoacetate, acetyl acetone, sodium bisulfite, and the like. The sodium bisulfite addition product is especially useful since it is water soluble or dispersible and can be easily mixed with an aqueous solution of the polymeric polybasic acid to give an all-aqueous system. Separate application of the polymeric polybasic acid and the polyol-polyisocyanate reaction product may be employed with highly satisfactory results. This procedure prevents premature reaction of the principal constituents of the coating and does not require a mutual solvent for the polymeric polybasic acid and the polyol-polyisocyanate reaction product. Preferably, the polymeric polybasic acid is applied first from water or other polar solvent. The solvent is evaporated to give a uniform coating of the polymer. The polyol-polyisocyanate reaction product is then applied from a suitable inert organic solvent which is evaporated. Crosslinking occurs between the two additives by allowing them to remain at room temperature, but this reaction may be accelerated by heating. After evaporation of solvent, the coatings may be cured further at a temperature of 80–200° C. Catalysts, such as bismuth, tin, lead compounds and tertiary amine may be employed to facilitate the reaction.

The amount of acid-containing polymer which should be applied to the substrate depends partially on the end use application. For instance, in coating fabrics, the hand of the fabric will be affected by the amount of polymeric additive applied. The minimum amount consistent with effective antistatic properties and hydrophilic surface characteristics is desirable. If the amount of coating were too large, stiffness of the coated fabric would detract from its use in wearing apparel and the like. In other applications, such as treating hydrophobic fiber mats for paper products, larger amounts of additives would offer the advantage of increasing the stiffness of the treated product.

In general, the amount of polymeric polybasic acid that is preferably applied to fibers and textiles is in the range of 0.1–2% based on the weight of the fiber or textile, but may be 0.05–5%. The polyol-polyisocyanate reaction product serves the dual role of adhesive and crosslinking agent, and is used to the extent of 10% to 400%, based on the weight of the polymeric polybasic acid. Larger amounts of polyol-polyisocyanate reaction product may be useful (up to 500 weight percent based on the polymeric polybasic acid) when a primer coat is applied before application of the polymeric polybasic acid. The optimum amount required depends on the surface nature of the reactant and substrate.

The coatings in accordance with our invention may be applied to a wide variety of substrates. Especially useful applications involve treating fibers and textiles to impart antistatic and soil-resistant properties to the substrate. Among the natural and synthetic polymeric materials which tend to accumulate static charges and may be advantageously coated in accordance with the invention are the linear, crystalline polyesters such as polyethylene terephthalate and poly(cyclohexanedimethylene terephthalate); polyamides such as nylon 6 and nylon 66; poly(acrylonitrile); poly(vinyl chloride); vinylidene chloride copolymers; other poly(acrylics); cellulose acetate; cellulose triacetate; nitrocellulose; viscose rayon; cotton; wool; polyolefins such as polyethylene and polypropylene; linear, crystalline polyurethanes; and inorganic polymers such as glass.

This invention has been described in detail with particular reference to preferred embodiments thereof, but it will be understood that variations and modifications can be affected within the spirit and scope of the invention as described hereinabove and as defined in the appended claims.

We claim:

1. An article of manufacture comprising a structure having a coating thereon comprising a polymer having a molecular weight of 500–750,000 and containing an acidic group selected from the class consisting of carboxyl, sulfonic and phosphoric, at least 10% of the acidic groups being carboxyl, and having a ratio of carbon atoms to acidic groups in the repeating unit of polymer of 2:1 to 20:1, which polymer is crosslinked and adhered to the structure with 10–400%, based on the weight of the polymer, of the reaction product of organic polyisocyanate and polyol.

2. An article of manufacture comprising a structure having a coating thereon comprising a polymer having a molecular weight of 500–750,000 and containing an acidic group selected from the class consisting of carboxyl, sulfonic and phosphoric, at least 10% of the acidic groups being carboxyl, and having a ratio of carbon atoms to acidic groups in the repeating unit of polymer of 2:1 to 20:1, which polymer is crosslinked and adhered to the structure with 10–400%, based on the weight of the polymer, of the reaction product of organic polyisocyanate and a polyol selected from the class consisting of straight and branched chain aliphatic glycols, alicyclic glycols, cycloaliphatic glycols and arylene aliphatic glycols, said glycols containing 2–36 carbon atoms; poly(oxyalkylene) glycols having a molecular weight of 106–4,000; and hydroxy-terminated polyesters having a molecular weight of 200–10,000 and an acid number less than 10.

3. Claim 2 wherein the structure is composed of a hydrophobic resin.

4. Claim 2 wherein the structure is a fabric composed of hydrophobic fibers.

5. A fabric composed of fibers comprising poly(1,4-cyclohexanedimethylene terephthalate) and having a coating thereon comprising polyacrylic acid cross linked with 10–400%, based on the weight of the polyacrylic acid, of the reaction product of a hydroxy-terminated polyester having a molecular weight of 400–4,000 and an acid number less than 5, with a 100 mole percent excess, based on the hydroxy-terminated polyester, of an organic diisocyanate.

6. The process of imparting antistatic, soil-resistant properties to an article comprising a structure composed of a hydrophobic resin which comprises forming a mixture, with compatible solvent, of (A) a polymer having a molecular weight of 500–750,000 and containing an acidic group selected from the class consisting of carboxyl, sulfonic and phosphoric, at least 10% of the acidic groups being carboxyl, and having a ratio of carbon atoms to acidic groups in the repeating unit of polymer of 2:1 to 20.1, and (B) 10–400%, based on the weight of the polymer, of the reaction product of organic polyisocyanate and polyol, the reactivity of the isocyanate groups of said reaction product being inhibited to form a heat-reversible intermediate; coating said mixture onto said article, removing the solvent and heating the coating to react the polymer with the reaction product of polyol and polyisocyanate.

References Cited in the file of this patent
UNITED STATES PATENTS

| | | |
|---|---|---|
| 2,676,164 | Charlton et al. | Apr. 20, 1954 |
| 2,862,281 | Klausner | Dec. 2, 1958 |
| 2,929,737 | Tischbein | Mar. 22, 1960 |